Dec. 19, 1944.  D. W. FENTRESS  2,365,181
BELLOWS OR TUBING STRUCTURE
Original Filed Aug. 21, 1939
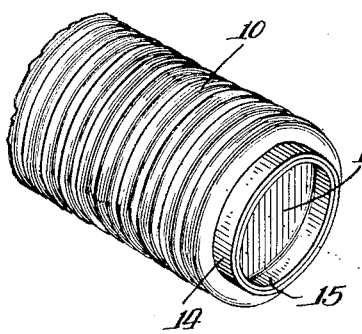
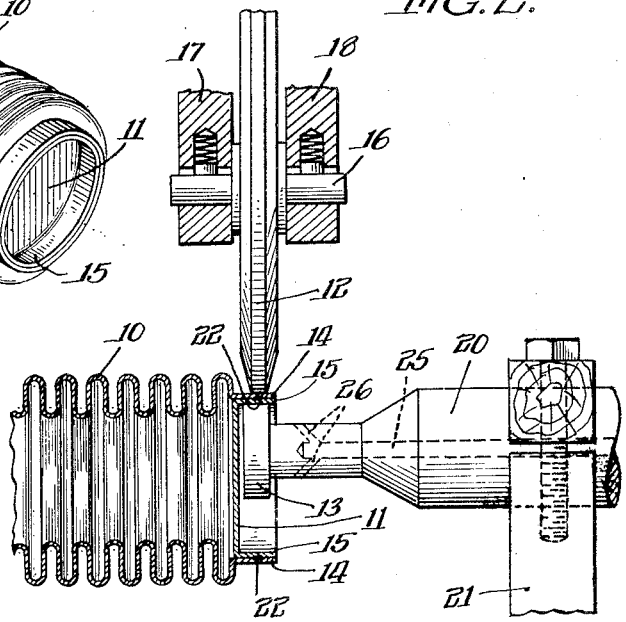
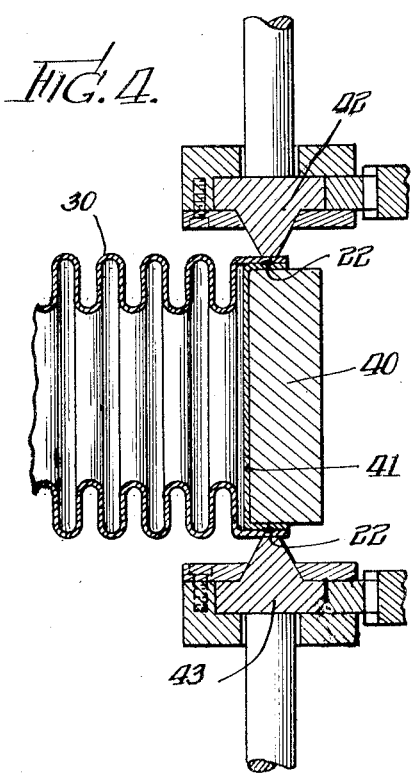
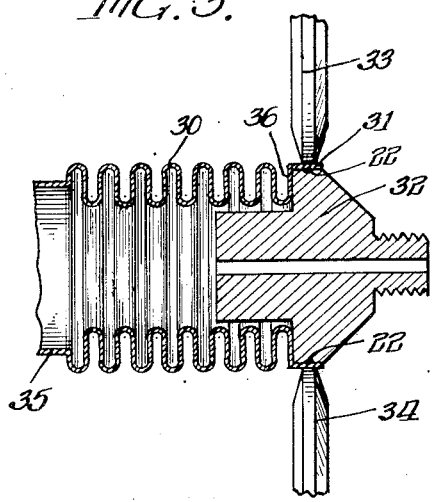
INVENTOR.
David Wendell Fentress
BY: Cox Moore & Olson
attys.

Patented Dec. 19, 1944

2,365,181

UNITED STATES PATENT OFFICE 2,365,181

BELLOWS OR TUBING STRUCTURE

David Wendell Fentress, Evanston, Ill., assignor to Chicago Metal Hose Corporation, Maywood, Ill., a corporation of Illinois Original application August 21, 1939, Serial No. 291,139. Divided and this application December 24, 1941, Serial No. 424,365

2 Claims. (Cl. 138—50)

This invention relates to flexible metallic bellows and to flexible metallic tubing structures, particularly of the axially compressible or bellows type.

It is an object of the invention to provide a bellows or flexible tubing structure of improved construction and operating characteristics, the invention having particular reference to end fittings, caps or seals, or the like, and to the manner of attachment of such fittings to the bellows or tubing proper.

More specifically stated, objects of the invention are to provide bellows or tubing structures of the class defined, which are wholly leak-proof even when subjected to high pressure and the action of searching and chemically active fluids, which may be readily fabricated, which are more durable and lasting in operation, and which may be more readily assembled into the structures with which they are adapted for use.

Various other objects, advantages and features of the invention will appear from the following specification when taken in connection with the accompanying drawing, wherein certain preferred embodiments of the invention are set forth for purposes of illustration.

In the drawing, wherein like reference numerals refer to like parts throughout:

Fig. 1 is a general perspective view of a bellows or flexible tubing structure constructed in accordance with the principles of the invention;

Fig. 2 is a sectional view through the structure of Fig. 1, and more particularly illustrating one preferred means and method for fabricating the structure;

Fig. 3 is a view similar to Fig. 2, but showing a modified form of end fitting and modified fabricating means; and Fig. 4 is a view also similar to Fig. 2 but showing a further modified form of structure and fabricating means.

This application is a division of my copending application, Serial No. 291,139, filed August 21, 1939, and entitled Welding method and apparatus. The claims of the present application are directed to the article.

Referring more particularly to the drawing, and first to Figs. 1 and 2 thereof, a flexible bellows or tubing member is indicated at 10, and a coupling member, specifically an end seal fitting in the embodiment shown, is indicated at 11. The bellows or tubing member may be of any desired length, to meet the requirements of any particular installation, and, as shown, is of the one-piece, annularly corrugated type. It is of thin walled construction, and preferably of stainless steel. The end seal fitting 11 may be of generally similar character, and when secured in position forms a fluid-tight end seal for the bellows member.

In accordance with the principles of the invention, the fitting 11 is secured to the bellows member by means of an electric resistance seam weld extending continuously circumferentially of the structure. Means may be provided for effecting such electric resistance seam weld, as somewhat diagrammatically shown in Fig. 2. This means comprises an outer electrode roller 12 and an inner electrode roller 13 adapted to clampingly embrace the bellows or tubing member and the end fitting. More specifically, the bellows or tubing is provided on its end with a cylindrically extending end flange 14, and the fitting 11 is similarly provided with a cylindrically extending flange 15 adapted to fit within the cylindrical flange 14 in snug embraced relation. The cooperating electrode rollers 12 and 13 are adapted to cooperatively grip the concentrically positioned flanges 14 and 15 of the bellows and fitting members.

The outer electrode roller 12 is provided with an axle 16 suitably rotatably mounted within a pair of support bearings 17 and 18, which may comprise the cooperating support portions of a bifurcated member, adapted to be connected to a suitable source of welding current supply, such as the secondary of a welding transformer or the like. Means, not shown, may be provided for vertically raising and lowering the supports 17 and 18, whereby to bring the welding roller 12 into operative engagement with the work, and to remove it from the work to facilitate reloading operations.

The inner roller electrode 13 is formed as a part of or secured to a shaft 20 suitably rotatably supported within a bearing or pillow block 21. Means, not shown, may be associated with the end of the shaft 20 for rotatably driving it to effect the welding operation. Also, the shaft 20 is adapted to be connected to the return side of the welding transformer secondary, so that the welding current may be passed between the roller electrodes.

In operation, the work parts 10 and 11, which have previously been arranged in assembled position, are laid over the inner roller electrode, as shown in Fig. 2. The outer roller electrode is then brought downwardly into tight gripping engagement with the work, and the inner roller electrode is then rotated and the welding current applied. As the rotation progresses, a circular seam resistance weld, as indicated at 22, is progressively produced, extending circumferentially of the nested flanges 14 and 15.

Heretofore end seals have been provided for flexible bellows structures by drawing the metal of the bellows side walls into cup shape at the bellows end. While this method will suffice for certain types of materials, in the case of stainless steel, of which the bellows or flexible tubing is constructed in accordance with the preferred embodiment herein illustrated, drawing operations may be performed only with the greatest difficulty and are in general unsatisfactory. In accordance with the principles of the present invention, such drawing operations are avoided and rendered unnecessary. In this connection, it will be noted that, in accordance with the structure herein disclosed, the side wall portions of the bellows or flexible tubing are stressed only to form the necessary corrugations or undulations in the side walls. The end seal or fitting 11 is formed as a separate metallic piece, which may itself be stamped into the desired shape, prior to the welding operation.

The methods as herein disclosed, for connecting the end fitting or coupling to the bellows member, are also to be clearly distinguished from brazing or soldering operations or the like. As heretofore stated, in the illustrated embodiment, the bellows or flexible tubing member 10 is of thin walled, stainless steel construction. Such thin walled, stainless steel tubing may have a thickness on the order of .003 to .008 inch. The thickness of the coupling may be substantially that of the tubing, or considerably greater. However, in view of the paper-like thinness of the stainless steel tubing wall, extreme difficulties are encountered in attempting to secure the same by ordinary methods. For example, if attempt is made to braze or solder the fitting or coupling to the tubing, the heating resulting from the application of a blowtorch or the like, to effect the brazing or soldering operation, will result in an annealing of the paper-thin tubing wall in the vicinity of the brazed or soldered joint. This annealing action weakens the wall structure, so that, as the corrugations or undulations of the wall are flexed and stressed in use, a premature and early breakdown of the metal fibers results. Similar unsatisfactory results are encountered by welding operations conducted by means of a blow-torch or the like. However, in accordance with the invention, heating effects are localized substantially within the confines of the welded joint itself, and no annealing action along the adjacent tubing wall portions results.

To insure such localizing of the heating effects, means is preferably provided for applying cooling liquid to the electrodes and the work piece in the vicinity of the welding station. As illustrated in Fig. 2, such cooling means comprises a channel 25 disposed centrally within the shaft 20, and a plurality of auxiliary or nozzle ducts 26 communicating with the end of channel 25. Cooling liquid may be supplied to the channel 25 in any suitable manner, which cooling liquid passes outwardly through the ducts 26 and is sprayed directly onto the roller electrodes and onto the work pieces in the vicinity of the welding station. Such cooling not only insures that there will be no annealing of adjacent work piece portions, but further prevents the melting of any plating metal, such as tin or the like, which may be applied to the work pieces, and also precludes undue deterioration of the work piece metal structures themselves, such, for example, as carbide precipitation, in the case of Austenitic stainless steel.

When the present methods are employed, it is further to be noted that the end fitting, such as indicated at 11, may be of a thickness only that of the tubing or bellows walls. The use of relatively thin fittings is thus permitted, so that the fittings may be stamped, as distinguished from machined, thereby effecting a material saving in fabrication costs.

Further, in the case of laminated bellows structures, wherein the corrugated wall portions are composed of several laminated material layers, the circular seam resistance welding insures a firm bond between the several wall thicknesses at the welded joint, such as is not possible otherwise. More particularly, air bubbles and the like, which tend to form during the course of ordinary securing operations, exhibit no deleterious influences upon the welded joint of the present structure.

It is further to be noted that, in accordance with the present invention, the fitting member or coupling piece, as the case may be, may be of the same metal as the tubing or bellows walls, and in such event there will only be the single parent metal exposed to the action of fluids within the bellows structure. Accordingly, chemical activity between dissimilar metals and reactivity with the conducted or enclosed fluids are minimized.

Particular attention is directed to the manner in which the cooperating flanges 14 and 15 of the work pieces are arranged. By reason of the cylindrical disposition of these parts, a firm and extended weld may be formed, limited as to length only by the thickness of the welding electrodes and the axial width of the flanges themselves. By this means a weld of any desired width may be produced to meet the pressure requirements of any particular installation. The weld will not break down during any subsequent operations by means of which the bellows or tubing structure, as a whole, may be applied to the machine with which it is adapted for use, even though welding is again employed during the securing operations.

In Fig. 3 a modified structure is illustrated. In this instance the thin walled, axially compressible stainless steel tubing or bellows 30 is provided with a cylindrically extending end flange 31, which flange cooperates with a comating cylindrical surface formed on the end fitting 32, as in the embodiment previously described. However, in this instance the fitting 32 is in the form of a coupling piece having a substantially solid body. To effect the circular seam resistance welding operation a pair of welding rollers 33 and 34 is provided, engageable at diametrically spaced stations on the structure. As the welding rollers are rotated and the welding current applied, a complete circumferential circular seam resistance weld will be formed between the tubing end and the coupling piece, upon a 180° rotation of the work parts. In this instance the path of current travel between the electrodes will take place through the body of the coupling member, which is the path of least current resistance, and a weld will be formed, as indicated at 22, as in the case of the previously described embodiment.

In both Figs. 2 and 3 it will be noted that the cooperatively disposed surfaces of the tubing and coupling member are cylindrically disposed, forming a firm reactive base for the welding electrodes, and permitting the formation of a sufficient sized weld to meet the requirements of the installation. Also, the weld is formed in immediate juxtaposition to the vertical wall of the end tubing convolution, thus reinforcing such convolution and permitting the proper operation thereof as the structure is flexed in use. However, in Fig. 3 the end flange 31 of the tubing is disposed outwardly of the normal or mean tubing diameter, as indicated at 35, whereas in Fig. 2 the corresponding end flange 14 of the tubing is substantially coincident with the mean tubing diameter. Generally, the arrangement of Fig. 2 is preferable as it reduces the stressing of the metal fibers of the flange. However, in Fig. 3 it will be noted that the coupling body itself engages and reinforces the extreme end wall 36 of the end tubing convolution.

In Fig. 4 a still further arrangement is illustrated. In this instance a plug member 40 is employed, and inserted into the cap or end fitting 41 prior to the welding operation. During the welding the current passes between the electrodes 42 and 43, which in this instance are illustrated as being longitudinally reciprocable, through the intermediary of the plug member 40 which may be removed from the work pieces after the welding operation. The plug member in this instance will be of suitable electrode material, such as copper or copper alloy. The plug member constitutes a removable means usable during the welding operation for supplying sufficient metal mass to transmit the welding current between exteriorly positioned electrodes. The finished coupling connection is similar to that illustrated in Fig. 2, except that the end flange of the tubing is substantially concentric with the exterior tubing diameter, as in Fig. 3.

It is obvious that various changes may be made in the specific embodiments of the invention set forth for purposes of illustration without departing from the spirit of the invention. The invention is accordingly not to be limited to the specific illustrated embodiments, but only as indicated in the following claims.

The invention is hereby claimed as follows:

1. An article of the class described, comprising a length of flexible metal tubing, said tubing being of one piece construction and being provided with spaced annular convolutions, the collective radial extent of each convolution diametrically of the tubing being substantially not less than one-fourth of the tubing external diameter and the depth of the convolutions being greater than the pitch thereof, said tubing having a wall thickness of substantially no more than .01 inch, said tubing having formed on its end in immediate juxtaposition to the end convolution an axially directed annular flange, and a cup-like end cap member of sheet metal secured to the end of said tubing length, said cap member being provided with an axially directed flange co-mating with the axial tubing flange and a juxtaposed radially directed wall portion, and a circular seam resistance weld extending peripherally of said tubing flange and said co-mating cap flange and securing the flanges together in a fluid-tight joint connection, said end convolution and the other convolutions of the tubing having uniform resiliency characteristics of cold worked metal.

2. An article as defined in claim 1, wherein said axially directed tubing flange lies between the limits of the crest and trough portions of the tubing convolutions.

DAVID WENDELL FENTRESS.